Oct. 13, 1953 C. L. KELSO 2,655,401
PIPE CARRYING CLAMP
Filed Aug. 23, 1948

INVENTOR.
Clarence L. Kelso
BY
ATTORNEY.

Patented Oct. 13, 1953

2,655,401

UNITED STATES PATENT OFFICE 2,655,401

PIPE CARRYING CLAMP

Clarence L. Kelso, Oilton, Okla.

Application August 23, 1948, Serial No. 45,696

5 Claims. (Cl. 294—86)

This invention relates to equipment for handling materials and particularly cylindrical objects such as relatively large, heavy pipe, the primary object being to provide a clamp adapted for connection with the usual lifting means in the nature of swingable booms or other hoisting structures.

The most important object of this invention is to provide a pipe carrying clamp having a pair of relatively shiftable frame members provided with a pair of opposed work-engaging jaws movable toward and from each other into and out of clamping relationship with the pipe to be lifted respectively as the frame members are relatively shifted.

Another object of this invention is to provide a pipe carrying clamp wherein the above-mentioned jaws are pivotally mounted on one of the frame members adjacent one end thereof for swinging movement toward and away from each other and so connected to the other of the frame members for controlling the extent of such swinging motion.

Another object of this invention is to provide a pipe carrying clamp wherein the frame members are guided in a substantially rectilinear path of travel, the aforesaid jaws having their points of swinging movement also disposed for such straight movement along with the frame member to which they are attached and provided further with guiding means disposed at an angle to the path of travel of the frame members to the end that the jaws are swung toward and away from each other as the frame members are shifted relatively.

A further object of this invention is the provision of a swingable arm so disposed and mounted upon one of the frame members for manually holding the frame members apart with the jaws thereof in clamping relationship to a pipe to permit rolling of such pipe as desired.

Another object of this invention is the provision of a continuous cable mounted upon one of the frame members and supported by the other of said frame members for facilitating releasing of the clamp when the same is resting in a position where releasing is not automatic.

A still further object is to provide a manual releasing means for holding the frame members in a position with the jaws thereof spread apart for receiving the pipe to be handled.

Another object is to provide means on one of the frame members for guiding the entire apparatus away from obstructions such as the sides of a ditch when the same is lowered thereinto.

Other more minor objects of this invention will be made clear or become apparent as the following specification progresses, reference being had to the accompanying drawing, wherein.

Figures 1, 2:
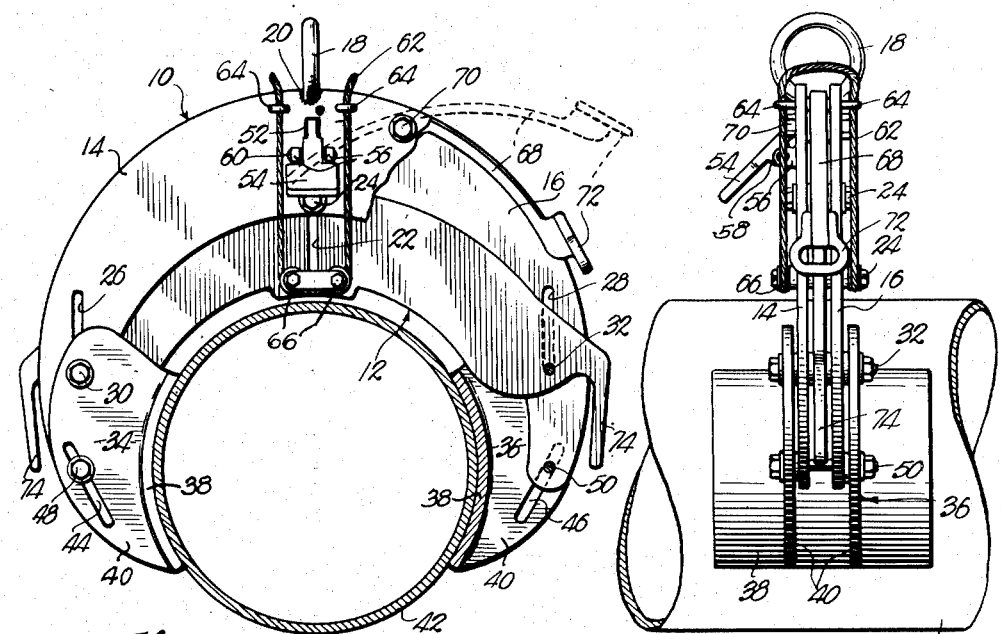
Fig. 1 is a side elevational view of a pipe carrying clamp made in accordance with the present invention, parts being broken away and in section to reveal details of construction and showing the clamp in an operative position upon a cylindrical member to be handled.
Fig. 2 is an edge elevational view of the clamp illustrated in Fig. 1.

It is realized that clamps have heretofore been made and placed in use for handling relatively heavy objects particularly in the field of pipeline construction capable of attachment to a crane or the like for unloading the pipe, carrying the same to a point of use and lowering the same into a ditch provided therefor. For the most part, however, such clamps have not been entirely satisfactory because of the difficulties encountered in not positively clamping the pipe, resulting in accidents and time delay because of slippage; have not been capable of easily and quickly releasing themselves from the pipe being handled; and incapable generally for fulfilling the objects above set forth.

The improved clamp shown in the drawing and about to be described is of sturdy construction, relatively inexpensive to manufacture and entire capable of use over long periods of time without faulty operation in any way.

The clamp includes a pair of relatively shiftable frame members broadly designated by the numerals 10 and 12 respectively. The frame member 10 is sectional and constitutes a pair of spaced apart identical segments 14 and 16. These segments 14 and 16 are both crescent-shaped and secured together intermediate the ends thereof by a laterally projecting ring 18 adapted to receive the hook or other fastening means forming a part of the crane or other hoisting device with which the clamp is to be used.

The hook 18 is welded as at 20 or otherwise suitably secured rigidly to the segments 14 and 16 of frame member 10. The frame member 12 is, also, crescent-shaped and conforming substantially to the contour of the frame member 10 and disposed for free, shiftable movement between the segments 14 and 16 and relative thereto.

A transverse slot 22 that is normally disposed with its longitudinal axis on a vertical plane is formed in the frame member 12 intermediate the ends thereof. This slot 22 of frame member 12 receives a bolt or the like 24 that interconnects the two segments 14 and 16 of frame member 10 near the innermost edge of the latter and in diametrically opposed relationship to the loop or ring 18. Thus, the slot 22, the bolt 24 and the ring 18 are in substantial alignment as is clear in Fig. 1 of the drawing. The segments 14 and 16 of frame member 10 are provided with a pair of normally vertical slots 26 and 28, such slots of one segment 14 being in alignment with like slots 26 and 28 in the segment 16. These four slots 26 and 28 are disposed within the legs of the segments 14 and 16 in spaced relationship to the free ends of such legs and with their longitudinal axes in substantial parallelism with the slot 22 of frame member 12.

A pair of bolts 30 and 32 pass through the openings 26 and 28, respectively, of frame member 10, such bolts 30 and 32 being freely slidable within slots 26 and 28 in the same manner as bolt 24 is mounted within the slot 22.

A pair of opposed jaws broadly designated by the numerals 34 and 36, respectively, are disposed adjacent the free ends of the legs of frame members 10 and 12, said jaws 34 and 36 being of identical nature and including a plate 38 and a pair of spaced-apart arms 40 projecting laterally from one face thereof. As is clear in Fig. 1 of the drawing, the plates 38 are both arcuate in cross section to substantially conform to the contour of a pipe or other cylindrical member 42 to be handled by the apparatus, as will hereinafter be made clear.

The arms 40 extend from the normally rearmost face of the respective plates 38 and are provided with aligned openings adjacent one end thereof for pivotally receiving either the bolt 30 or the bolt 32, as the case may be.

As illustrated in Fig. 2 of the drawing, the distance between the arms 40 is greater than the over-all width of the frame member 10, the latter being disposed between the arms 40 and the bolts 30 and 32 passing through the frame member 12, as shown in Fig. 1. It is thus seen that the frame members 10 and 12 are relatively shiftable and, as the frame member 12 moves to and from a position between the segments 14 and 16 of frame member 10, the same will be guided in a substantially straight path of travel by bolts 24, 30 and 32 freely sliding within their respective slots 22, 26 and 28. It is seen that the jaws 34 and 36 are swingable upon the bolts 30 and 32, respectively, and, by virtue of such bolts 30 and 32, jaws 34 and 36 are shiftable with the frame member 12 to which they are secured. Accordingly, that portion of the jaws 34 and 36 next adjacent their respective bolts 30 and 32 move through rectilinear parallel paths of travel as the frame members 10 and 12 are relatively shifted. The arms 40 of the jaw members 34 and 36 are, also, provided with aligned, angularly disposed slots 44 and 46, respectively.

These slots 44 and 46 are disposed intermediate the ends of the arms 40 and adjacent that end thereof opposite to the pivotal points 30 and 32. These angularly disposed slots 44 and 46 receive bolts 48 and 50, respectively, for free sliding movement therein. Bolts 48 and 50 pass through both of the segments 14 and 16 adjacent the free ends of the legs thereof, as clearly illustrated in the drawing. It is seen, therefore, that the free ends of the legs of the frame member 12 extend but a short distance between the arms 40 of jaws 34 and 36, whereas the free ends of the legs of segments 14 and 16 project beyond frame member 12 to a point near the normally lowermost free end of jaws 34 and 36.

As the frame members 10 and 12 are relatively shifted, moving the bolts 30 and 32 and consequently a portion of jaws 34 and 36 through substantially straight paths of travel, the lowermost ends of the jaws 34 and 36 will swing toward and away from each other as the same pivot upon the bolts 30 and 32, respectively. The disposition of the slots 44 and 46 for receiving bolts 48 and 50, respectively, controls such swinging movement of jaws 34 and 36.

Figs. 1 and 2 of the drawing illustrate the position of the jaws 34 and 36 in clamping relationship with the outermost surface of pipe 42 when the frame member 12 is at the normally lowermost end of its path of travel with respect to the frame member 10.

Figures 3, 4:
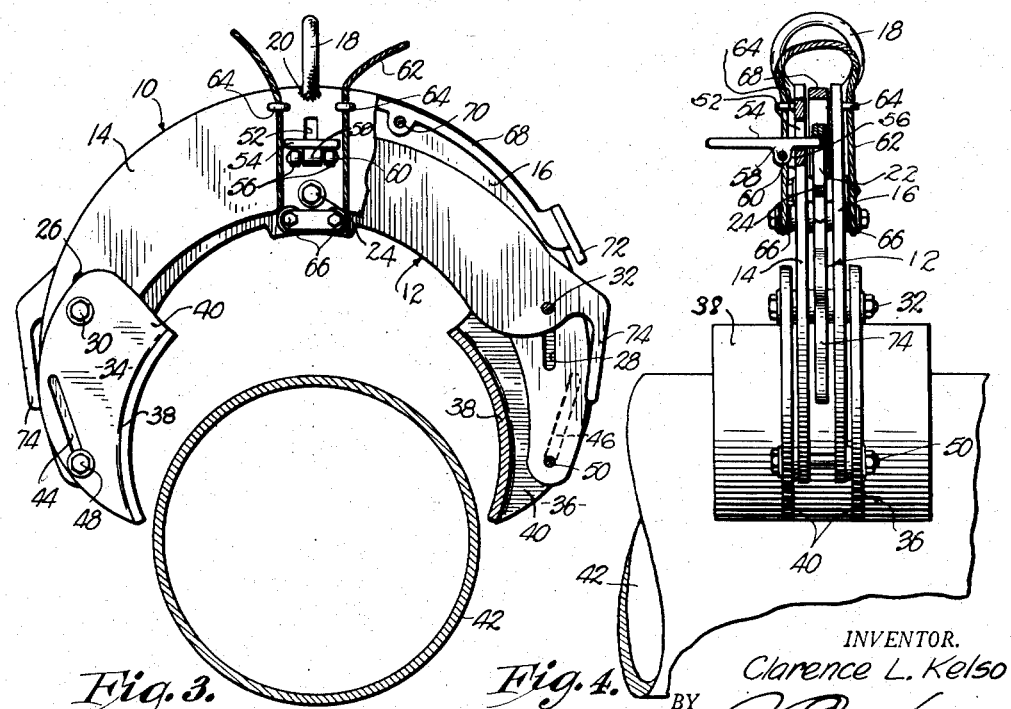
Fig. 3 is a view similar to Fig. 1 partially in elevation and partially in section showing the clamp in an open position prior to mounting upon a pipe.
Fig. 4 is an edge elevational view similar to that shown in Fig. 2 showing the clamp in the position of Fig. 3 of the drawing.

Figs. 3 and 4 of the drawing show the way in which the jaws 34 and 36 are disposed in spaced-apart relationship for receiving the pipe 42 when the frame member 12 is at the normally uppermost end of its path of travel between the segments 14 and 16 of frame member 10.

A relatively short slot 52 is formed in the segment 14 of frame member 12 between the ring 18 and the transverse bolt 24. This slot 52 has its longitudinal axis in alignment with the longitudinal axis of the slot 22 and is disposed to receive one end of a dog 54 that is swingably mounted upon a pair of out-turned ears 56 on the outermost face of the segment. The dog 54 has a laterally projecting leg 58 intermediate the ends thereof and projecting from the normally lowermost face thereof. This leg 58 is disposed between the ears 56 and a pivot pin 60 passes through the ears 56 and the leg 58. Accordingly, the dog 54 is swingable from the position illustrated in Figs. 1 and 2 of the drawing to that shown in Figs. 3 and 4 of the drawing through slot 52, where the innermost end thereof passes into the slot 22 of frame member 12 and holds the latter against downward movement with respect to frame member 10, the uppermost end of the slot 22 resting directly upon the dog 54.

Fig. 1 of the drawing shows the T-shaped contour of dog 54, causing the same to maintain the position of Fig. 4 by resting directly upon the outermost face of segment 14.

A continuous cable 62 is mounted upon the frame members 10 and 12. The outermost faces of both segments 14 and 16 are provided with a pair of spaced-apart loops 64 and a pair of spaced-apart rollers 66 are mounted on opposed faces of the frame member 12 adjacent the innermost edge thereof and in close proximity to the normally lowermost end of slot 22. Cable 62 slidably passes through all four of the loops 64 on frame member 10 and around the pair of rollers 66 on both sides of the frame member 12.

An elongated, longitudinally arcuate arm 68 is disposed between the segments 14 and 16 of frame member 10 and pivotally secured thereto, as at 70, intermediate the ends of the arm 68, is provided with a handle 72 at the outermost free end thereof. Arm 68 normally rests in the position shown in full lines of Figs. 1, 2 and 3 and is swingable to and from a position where the innermost end thereof engages the proximal uppermost edge of frame member 12, as shown by dotted lines in Fig. 1. The free ends of the frame member 12 are each provided with a substantially L-shaped projection 74 that extends outwardly from the frame member 10 and downwardly to terminate in spaced relationship to the proximal ends of the frame member 10 in either of the positions of Fig. 1 or 3.

In operation, the entire clamp assembly is lifted and carried by a crane or the like connecting directly with the loop 18. With the clamp normally in the position shown in Fig. 3 of the drawing, the same is lowered toward the pipe 42 to be lifted or otherwise handled thereby and, as the lowermost edge of the frame member 12 engages and rests upon the pipe 14, the inherent weight of the clamp assembly will automatically release the dog 54. In other words, with frame member 12 resting upon the pipe 42, the frame member 10 will continue its downward movement, thereby moving the dog 54 downwardly with respect to the uppermost end of slot 22 and dog 54 will swing by the action of gravity to the position shown in Figs. 1 and 2. As the clamp assembly is actuated to move frame member 10 upwardly with respect to frame member 12, the jaws 34 and 36 will automatically move toward each other and into clamping relationship with the pipe 42, as shown in Figs. 1 and 2. As continued upward movement is exerted upon the frame member 10, the jaws 34 and 36 will move tightly, engaging the pipe 42 and the latter will be lifted together with the clamp for movement to desired positions.

Oftentimes, it becomes necessary, while handling the pipes 42, to rotate the same for purposes such as disposing seams at a desired position or for purposes of welding or otherwise working upon such pipe 42. Such rolling action can be imparted to the pipe 42 by use of the arm 68. The clamp assembly is moved toward the position illustrated in Fig. 1 of the drawing but with the same rotated slightly from the true vertical position shown in Fig. 1. In other words, the clamp assembly is positioned upon the pipe 42 with one of the jaws 34 or 36 disposed lower than the other jaw and then the operator grasps handle 72 and swings the arm 68 to the dotted-line position shown in Fig. 1. By holding arm 68 in such a position, forcing the frame members 10 and 12 apart and in the position shown in Fig. 1, and simultaneously lifting the entire assembly by means of the loop 18, the operator can roll pipe 42 to the position desired. By manipulating the arm 68 and through continued steps of regripping pipe 42, continued rolling movement may be imparted thereto. To release the clamping assembly from gripping engagement with the pipe 42, the frame member 10 is permitted to move downwardly until the dog 54 can be manually swung into the position illustrated by Figs. 3 and 4 of the drawing. Oftentimes, however, particularly when the pipe 42 is lowered in a ditch, large clots of dirt and mud upon which the jaws 34 and 36 are resting, will prevent such releasing. The operator then may merely release the crane hook from loop 18 and place the same around the upstanding loops of cable 62 and, when this cable 62 is moved upwardly, frame member 12 will be drawn to the position between segments 14 and 16, thereby releasing jaws 34 and 36.

Another difficulty that is often encountered when clamp assemblies of this character are lowered into a ditch for receiving a pipe 42 or for placing the latter within such ditch, lies in the way in which the assembly strikes the wall of such ditch and preventing operating of the assembly as desired. Accordingly, the down-turned, substantially L-shaped projections 74 on the frame member 12 are provided to deflect the entire assembly when the same comes into contact with such walls. These projections 74, obviously, will operate to guide the clamp assembly away from any obstruction that might prevent easy movement of the clamp to and from a position for handling the pipes 42.

It is apparent from the foregoing that a material-handling apparatus has been provided that will meet virtually all conditions encountered in the field and will save time and labor in the handling of such otherwise clumsy and bulky materials.

It is manifest that such changes and modifications as fairly come within the scope of the appended claims are contemplated hereby.

Having thus described the invention, what is claimed as new and desired to be secured by Letters Patent is:

1. Material handling apparatus comprising a pair of relatively shiftable frame members; a pair of opposed jaws mounted on one of said frame members, at least one of said jaws being swingable on said one frame member toward and from the other jaw; means connecting said one jaw and the other of said frame members for controlling the swinging movement of said one jaw as the members are relatively shifted; and means for guiding the said one jaw at the point of swinging movement thereof on the one frame member through a predetermined path of travel as the frame members are relatively shifted, said means for controlling the swinging movement of said one jaw comprising structure for guiding a portion thereof remote from said point of swinging movement in a path of movement at an angle to said path of travel.

2. Material handling apparatus comprising a pair of relatively shiftable frame members; a pair of opposed jaws movably mounted on one of said frame members; and means connecting the jaws and the other of said frame members for moving a portion of the jaws through one path of travel and another portion of the jaws through a second path of travel toward and away from each other as the frame members are relatively shifted, said means including a slot formed in said other frame member for each jaw respectively and a pin pivotally interconnecting each jaw with said one frame member and slidable within the proximal slot.

3. Material handling apparatus as set forth in claim 2, wherein said one frame member includes a pair of spaced elements, said other frame member being reciprocably mounted for movement between said elements.

4. Material handling apparatus comprising a pair of relatively shiftable frame members; a pair of opposed jaws movably mounted on one of said frame members; and means connecting the jaws and the other of said frame members for moving a portion of the jaws through one path of travel and another portion of the jaws through a second path of travel toward and away from each other as the frame members are relatively shifted, said means including a slot formed in said other frame member for each jaw respectively and a slot in each of said jaws respectively, there being pins slidable in the slots for interconnecting the jaws and the frame members.

5. Material handling apparatus comprising a pair of relatively shiftable frame members; a pair of opposed jaws movably mounted on one of said frame members; and means connecting the jaws and the other of said frame members for moving a portion of the jaws through one path of travel and another portion of the jaws through a second path of travel toward and away from each other as the frame members are relatively shifted, said means including a slot formed in said other frame member for each jaw respectively and a slot in each of said jaws respectively, there being pins slidable in the slots for interconnecting the jaws and the frame members, said slots in the jaws being relatively inclined.

CLARENCE L. KELSO.

References Cited in the file of this patent

UNITED STATES PATENTS

| Number | Name | Date |
|---|---|---|
| 1,495,544 | Abernathy | May 27, 1924 |
| 1,575,185 | Stenhouse | Mar. 2, 1926 |
| 2,298,145 | Merrylees | Oct. 6, 1942 |